United States Patent
Khsiba et al.

(10) Patent No.: US 9,819,404 B2
(45) Date of Patent: Nov. 14, 2017

(54) REORDERED SUB-BLOCK DECODING

(71) Applicant: INSTITUT MINES-TELECOM, Paris (FR)

(72) Inventors: Mohamed-Achraf Khsiba, Paris (FR); Ghaya Rekaya Ben-Othman, Paris (FR); Asma Mejri, Antibes (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/389,765

(22) Filed: Dec. 23, 2016

(65) Prior Publication Data
US 2017/0187433 A1    Jun. 29, 2017

(30) Foreign Application Priority Data
Dec. 28, 2015   (EP) ..................... 15307154

(51) Int. Cl.
*H04B 7/185*   (2006.01)
*H04B 7/0413*  (2017.01)
(Continued)

(52) U.S. Cl.
CPC ......... *H04B 7/0413* (2013.01); *H04B 7/0697* (2013.01); *H04L 27/2649* (2013.01); *H04W 84/042* (2013.01); *H04W 84/12* (2013.01)

(58) Field of Classification Search
CPC . H04B 7/0413; H04B 7/0697; H04L 27/2649; H04W 84/042; H04W 84/12
See application file for complete search history.

(56) References Cited

U.S. PATENT DOCUMENTS

| | | |
|---|---|---|
| 8,121,220 B1 | 2/2012 | Shi et al. |
| 8,848,811 B2 * | 9/2014 | Rius I Riu ........ H04L 25/03159 375/227 |

(Continued)

FOREIGN PATENT DOCUMENTS

| | | |
|---|---|---|
| EP | 15306808.5 A1 | 5/2017 |
| WO | 2008056886 A1 | 5/2008 |

OTHER PUBLICATIONS

G.J. Foschini. "Layered Space-Time Architecture for Wireless Communication in a Fading Environment When Using Multi-Element Antennas", Bell Labs Tech. J. vol. 1, pp. 41-59. 1996.

(Continued)

*Primary Examiner* — Dac Ha
(74) *Attorney, Agent, or Firm* — Meagher Emanuel Laks Goldberg & Liao, LLP

(57) ABSTRACT

Embodiments of the invention provide a decoder for decoding a signal represented by a vector of information symbols received through a transmission channel in a communication system, said the transmission system being represented by a channel state matrix, said information symbols being selected from a given set of values carrying a set of information bits, wherein said decoder comprises:
  a division unit (202) configured to divide the channel state matrix into a number of sub-blocks of column vectors, in accordance with a division of said vector of information symbols into a number of sub-vectors;
  a permutation unit (203) configured to determine a set of permuted channel state matrices by permuting said sub-blocks of column vectors, the permutation unit (203) being further configured to select at least one permuted channel state matrix among said set of permuted channel state matrices according to a selection criterion;

(Continued)

111 a sub-block decoding unit (207) configured to determine a transformed signal from said signal and said at least one permuted channel state matrix and determine at least one estimate of each sub-vector of information symbols from said transformed signal by applying at least one iteration of a decoding algorithm;

The decoder being configured to determine at least one estimate of a vector of transmitted information symbols from said at least one estimate of each sub-vector of information symbols.

19 Claims, 4 Drawing Sheets

(51) Int. Cl.
    *H04B 7/06*     (2006.01)
    *H04L 27/26*     (2006.01)
    *H04W 84/04*     (2009.01)
    *H04W 84/12*     (2009.01)

(56) References Cited

U.S. PATENT DOCUMENTS

| | | | |
|---|---|---|---|
| 9,118,446 B2* | 8/2015 | Hu | H04L 1/0054 |
| 9,271,221 B2* | 2/2016 | Tong | H04B 7/0617 |
| 2010/0067597 A1 | 3/2010 | Park et al. | |

OTHER PUBLICATIONS

M.-O. Damen, H. El-Gamal, and G. Caire. "On maximum-likelihood decoding and the search for the closest lattice point.", IEEE Transactions on Information Theory, vol. 49, No. 10, pp. 2389-2402, Oct. 2003.

European Search Report for 153071543 dated Jul. 4, 2016.

Viterbo et al., "A Universal Lattice Code Decoder for Fading Channels", IEEE Transactions on Information Theory, vol. 45, No. 5, pp. 1639-1642, Jul. 1999.

Fano, "A Heuristic Discussion of Probabilistic Decoding", IEEE Transactions on Information Theory, vol. 9, No. 2, pp. 64-74, Apr. 1963.

G.R. Ben-Othamn , "The spherical bound stack decoder", IEEE International Conference on Wireless & Mobile computing, Networking & Communication, pp. 322-327, Oct. 2008.

Choi W-J et al., Combined ML and DFE Decoding for the V-Blast System, ICC 2000. 2000 IEEE International Conference on Communications. Conference Record. New Orleans, LA, Jun. 18-21, 2000; [IEEE International Conference on Communications], New York, NY : IEEE, US, vol. 3, Jun. 18, 2000 (Jun. 18, 2000), pp. 1234-1248.

D. N. Dao et al., "Four-Group Decodable Space-Time Block Codes", IEEE Transactions on Signal Processing, vol. 56, No. 1, pp. 424-430, Jan. 2008.

E. Biglieri et al., "On Fast-Decodable Space-Time Block Codes", IEEE International Zurich Seminar on Communications, pp. 116-119, Mar. 18, 2008.

T.P. Ren et al., "Fast-Group-Decodable Space-Time Block Code", In Proceedings of IEEE Information Theory Workshop, pp. 1-5, Jan. 2010.

* cited by examiner

203

207

REORDERED SUB-BLOCK DECODING

TECHNICAL FIELD

The invention generally relates to digital communication and in particular to methods and devices for decoding a data signal.

BACKGROUND

During the last decades, the design of communication systems has known a considerable evolution in order to satisfy increasing demands in terms of services and applications. The growing number of users and connected machines appeals for conceiving more and more reliable communication platforms and devices capable of providing real-time services with higher capacities.

Multiple-Input Multiple Output (MIMO) technologies have proved themselves as potential candidates to meet such targets. They have made an important contribution in the design of most performing communication systems available today. MIMO technologies have been for example incorporated in several standards such as in wireless LANs (WiMAX IEEE 802.16) and cellular mobile networks (3G and 4G).

MIMO technologies owe their success to their capability to increase data transmission rates by exploiting space and time dimensions for communicating data over a multiplicity of antennas and during a multiplicity of time slots. Space-Time coding techniques are used in transmitter devices to encode flows of information symbols carrying original data. Space-Time decoding techniques are implemented in receiver devices observing outputs of a MIMO channel to estimate the original data conveyed by one or more transmitter devices.

Space-Time coding and decoding techniques can be implemented in a wireless single-user MIMO system accommodating one multi-antenna transmitter device communicating with one multi-antenna receiver device. In such scenario, the multiple inputs of the MIMO system originate from the same transmitter device, and the multiple outputs are received at a single receiver device.

Space-Time coding and decoding techniques can be used in a wireless multi-user MIMO system accommodating a set of users equipped with one or more antennas and communicating with each other. Such communication system is also called 'distributed MIMO' since the multiple inputs are distributed in space over the different users. Cellular uplink communication is an example of a distributed MIMO channel. Different user equipments using each with one or more antennas that belong to a same coverage cell may communicate with a base station equipped with multiple antennas.

Space-Time coding and decoding techniques can be used in optical fiber communication systems. For example, the two polarization states of the electrical field of the optical wave or the different propagation modes of multi-mode optical fibers may be exploited to encode and decode a modulated signal carrying a sequence of binary data. Such optical MIMO systems have been identified as promising solutions for providing high transmission rates in optical-fiber links over long distances. Exemplary applications comprise Polarization Division Multiplexed systems (PMD) and Mode Division Multiplexed systems (MDM).

Space-Time coding and decoding techniques can be used in combination with multicarrier techniques using a large number of orthogonal sub-carriers. Exemplary applications comprise OFDM and Filter Bank Multicarrier (FBMC) systems. OFDM modulation formats are used to combat frequency-selective channels, interference and delays. FBMC systems may be used for example for dynamic access spectrum management and cognitive radio applications.

Space-Time coding and decoding techniques may further be used in combination with multiple access techniques in presence of several transmitters. Multiple access techniques are used to manage the access to shared resources, such as bandwidth, between the different users communicating in a same communication system. Exemplary multiple access techniques are the Code Division Multiple Access (CDMA) used for example in radio communication systems (e.g. 3G standards) and Wavelength Division Multiple Access (WDMA) used for example in optical communication systems.

Due to the multipath and superposition properties of the wireless medium and to the dispersion and multiple reflections of the optical fiber propagation environment, information symbols originating from the multiple inputs are mixed at the receiver device. The received signal or MIMO channel output represents a set of multiple linear combinations of different information symbols sent by one or more users, using one or more antennas, during different time slots and over different sub-carriers. The superposition of the different information symbols results in an inter-symbols interference in each linear combination.

A receiver device in a MIMO system implements a Space-Time decoder for estimating, from the received signal and a channel state matrix, the original data conveyed by one or multiple transmitter devices. It compares the received vector of information symbols with the possible transmitted symbols. Several decoding rules may be used depending on the required performance level and processing capabilities of receiver devices. The optimal decoding rule for uniformly distributed information symbols is known as maximum-likelihood (ML) decoding. It results in the minimum probability of decoding error. An ML decoder decides in favor of the vector of information symbols that is closest to the received signal. The closest vector to the received signal represents the vector that has the minimum Euclidean Distance with respect to the received signal.

ML decoders can be implemented in several ways. Exhaustive search-based implementations require intensive processing and storage capabilities that may exceed the available ones. Alternative ML sequential decoding schemes may be used to provide optimal performance while employing fewer computational and storage resources than the exhaustive search-based methods.

Sequential decoders are based on a QR decomposition of the channel state matrix and perform a tree search in a decoding tree to solve the ML decoding problem. The decoding tree comprises a plurality of nodes, levels, branches and paths. Nodes correspond to the different possible values of the information symbols.

Several ML sequential decoders exist and are generally divided into three families according to the tree-search strategy. Sequential decoders may be based on a depth-first strategy as disclosed for example in:

"E. Viterbo and J. Boutros. A universal lattice code decoder for fading channels. IEEE Transactions on Information Theory, 45(5):1639-1642, July 1999."

A breadth-first tree-search strategy may be used as in the Stack decoder disclosed for example in:

"R. Fano. A heuristic discussion of probabilistic decoding. IEEE Transactions on Information Theory, 9(2):64-74, 1963."

Other Sequential decoders may be based on a best-first strategy like the SB-Stack decoder as disclosed for example in the "G. R. Ben-Othman, R. Ouertani, and A. Salah. The spherical bound stack decoder. In Proceedings of International Conference on Wireless and Mobile Computing, pages 322-327, October 2008."

Space-Time (ST) decoders can be generally categorized as joint, single-stream or sub-block decoders, depending on whether the different streams constituting the vector of original information symbols are detected jointly, individually, or in groups of sub-vectors respectively. Joint decoders offer optimal performance but require a high computational complexity that increases as a function of the size of the constellation and of the number of deployed antennas. The size of the constellation generally impacts the number of nodes to be visited at each level. The number of deployed antennas generally impacts the number of levels in the decoding tree.

Using single-stream decoders, the various information symbols can be decoded individually. Single-stream decoders may rely on a linear decoding approach. In a linear decoding approach, the decoder first creates interference-free data flows to decouple the different information symbols and then delivers an estimation of each symbol separately. Accordingly, the decision on a given information symbol is independent from the remaining estimated symbols. Interference elimination in the first step is realized through a projection of the channel output using a filtering matrix. Zero-Forcing (ZF) and Minimum Mean Squared Error (MMSE) detectors are examples of linear single-stream decoders. Alternatively, Single-stream decoders can operate according to a non-linear decoding approach, the information symbols being estimated individually. However, unlike linear decoders, the estimation of a given symbol is impacted by the previously estimated symbols with non-linear decoders. The Zero Forcing-Decision Feedback Equalizer (ZF-DFE) decoder is an example of a non-linear single-stream decoder. It is known as a Successive Interference Cancellation (SIC) scheme. It uses a QR decomposition of the channel state matrix to recursively determine estimations of each single symbol from previously estimated symbols. Inter-symbol interference is then cancelled recursively, any decoding errors on a given symbol being propagated over the forthcoming estimations thereby inducing performance degradation. Linear and non-linear single-stream decoders require low decoding complexity but offer limited performance. Preprocessing techniques such as Lattice reduction and MMSE-GDFE preprocessing may be applied prior to decoding using such approaches to obtain better performance.

Using sub-block decoders, the vector of information symbols is divided into a plurality of sub-vectors and each sub-vector is decoded separately. The sub-vector division of the information symbols is performed in accordance with a sub-block division of a transmission channel representative matrix.

Certain sub-block decoders apply a combined ML and DFE decoding scheme for wireless MIMO systems using spatial multiplexing of data streams as disclosed in "Won-Joon Choi, R. Negi, and J. M. Cioffi. Combined ML and DFE decoding for the V-BLAST system. IEEE International Conference on Communications. Volume 3, pages 1243-1248, 2000." Accordingly, the vector of information symbols of a length n is divided into two sub-vectors of lengths p and n-p respectively. In a first decoding phase, the sub-vector comprising p information symbols is estimated using an ML decoder. Using these estimated symbols, the receiver recursively performs an inter-symbol interference cancellation using a decision feedback equalization to determine an estimation of the remaining n p symbols composing the second sub-vector of information symbols. Such 2-block decoding schemes allow the achievement of better performance than ZF-DFE decoding.

Other sub-block decoding schemes have been proposed for Space-Time Coded MIMO systems using linear Space-Time Block Codes (STBC). Particular classes of low-complexity ML-decodable STBCs have been considered such as the family of multi-group decodable codes disclosed in:

"D. N. Dao, C. Yuen, C. Tellambura, Y. L. Guan, and T. T. Tjhung. Four-group decodable space-time block codes. IEEE Transactions on Signal Processing, 56(1): 424-430, January 2008."

Other classes of low-complexity ML-decodable STBCs comprise fast decodable codes as disclosed in:

"E. Biglieri, Y. Hong, and E. Viterbo. On fast-decodable space-time block codes. In IEEE International Zurich Seminar on Communications, pages 116-119, March 2008."

Still other classes of low-complexity ML-decodable STBCs comprise fast-group decodable codes as disclosed in:

"T. P. Ren, Y. L. Guan, C. Yuen, and R. J. Shen. Fast-group-decodable space-time block code. In Proceedings of IEEE Information Theory Workshop, pages 1-5, January 2010."

Sub-block decoding in the presence of an STBC that belongs to one of these families of codes may be advantageously performed using the QR decomposition of the channel state matrix. The zero structure of the equivalent transmission channel matrix allows recursive decoding of the various sub-vectors of information symbols with reduced complexity without sacrificing the decoding error performance. Particularly, some sub-vectors of symbols may be estimated in a separate way in parallel allowing for faster and lower-complexity decoding.

The order at which the information symbols are decoded may affect the performance and/or the decoding complexity of ST decoders, essentially the decoding techniques based on the QR decomposition of the channel state matrix.

For example, an ordering of the different information symbols prior to sequential decoding may be implemented to accelerate the phase of the tree-search and therefore reduce the computational complexity required to find the ML solution.

Certain single-stream detectors using the ZF-DFE implement a ordering of the information symbols prior to decoding to reduce the impact of the inter-symbol interference and enhance the performance of ZF-DFE decoding.

Several examples of symbol decoding ordering such as V-BLAST and H-norm ordering have been proposed for ML sequential and single-stream decoders. V-BLAST ordering is disclosed, among other works, in: "G. J. Foschini. Layered Space-Time Architecture for Wireless Communication in a Fading Environment When Using Multi-Element Antennas. Bell Labs Tech. J. Volume 1, pages 41-59. 1996" is identified as the optimal ordering for ZF-DFE decoding. Accordingly, the symbol decoding order is organized according to their signal-to-noise ratios (SNR) in a decreasing order such that the first detected symbol is associated with the highest SNR. H-norm ordering is disclosed in: "M.-O. Damen, H. El-Gamal, and G. Caire. On maximum-likelihood decoding and the search for the closest lattice point. Information Theory, IEEE Transactions on, 49(10):2389-2402, October 2003". It consists of sorting the information symbols in accordance with a ordering of the column vectors of the channel state matrix according to an increasing order of their Euclidean norm.

To change the symbol decoding order, the ordering of the columns of the channel state matrix is generally changed. In certain decoders, the ordering of the columns of the channel state matrix is performed using a permutation matrix to achieve the desired ordering of the columns.

Existing symbol decoding ordering techniques perform symbol ordering according to a symbol-related ordering criterion. Such techniques may require an intensive computational complexity to find the permutation matrix that satisfies the desired ordering criterion. Their practical implementations may not be possible particularly in presence of a high number of transmit and/or receive antennas. Further, existing ordering techniques may not be applicable to sub-block decoders.

SUMMARY

To address these and other problems, there is provided a decoder for decoding a vector of information symbols received through a transmission channel in a communication system, from a received signal and a channel state matrix. The information symbols are selected from a given set of values carrying a set of information bits. The decoder comprises:
- a division unit configured to divide the channel state matrix into a number of sub-blocks of column vectors, in accordance with a division of the vector of information symbols into a number of sub-vectors;
- a permutation unit configured to determine a set of permuted channel state matrices by permuting the divided sub-blocks of column vectors. The permutation unit is further configured to select at least one permuted channel state matrix among the determined set of permuted channel state matrices according to a selection criterion;
- a sub-block decoding unit configured to determine a transformed signal from the received signal and the selected at least one permuted channel state matrix and determine at least one estimate of each sub-vector of information symbols from the transformed signal by applying at least one iteration of a decoding algorithm;

The decoder may be configured to determine at least one estimate of a vector of transmitted information symbols from the determined at least one estimate of each sub-vector of information symbols.

In one embodiment, the permutation unit may be configured to determine an upper triangular matrix and an orthogonal matrix from each permuted channel state matrix by performing a QR decomposition of each permuted channel state matrix in the set of permuted channel state matrices. The permutation unit may further comprise dividing each upper triangular matrix determined from each permuted channel state matrix into upper triangular sub-matrices and rectangular sub-matrices.

In one embodiment, the selection criterion used to select at least one permuted channel state matrix according may be related to the determined upper triangular sub-matrices and/or rectangular sub-matrices obtained by the QR decomposition of the permuted channel matrices. In particular, the selection metric may be chosen in a group consisting of the number of the zero components of the rectangular sub-matrices, the diagonal components of said upper triangular sub-matrices, the signal-to-noise-ratio associated to the upper triangular sub-matrices and the conditioning number of the upper triangular sub-matrices and/or the rectangular sub-matrices.

In one embodiment, the division unit may be configured to divide the channel state matrix depending on at least one sub-block decoding parameter. The at least one sub-block decoding parameter may be chosen in a group consisting of a predefined number of sub-blocks, a set of sub-block lengths, and a predefined set of decoding algorithms.

In one embodiment, the number of divided sub-blocks of column vectors of the channel state matrix may be set equal to the number of sub-blocks.

In one embodiment, the number of permuted channel state matrices may be less than or equal to the number of sub-blocks.

In one embodiment, the sub-block decoding unit may be configured to determine estimates of the sub-vectors of information symbols using similar or different decoding algorithms. A decoding algorithm may be chosen in a group consisting of a sequential decoding algorithm, a ZF decoding algorithm, a ZF-DFE decoding algorithm or an MMSE decoding algorithm.

In certain embodiments, the sub-block decoding unit may be further configured to perform a lattice reduction and/or MMSE-GDFE preprocessing on the selected at least one permuted channel state matrix.

In certain embodiments, the sub-block decoding unit may be configured to determine a plurality of estimates of each sub-vector of information symbols for delivering soft-output decisions on the set of information bits carried by the information symbols.

The invention also provides a receiver for receiving and decoding a vector of transmitted information symbols. The receiver comprises a decoder according to any preceding feature for decoding a vector of information symbols.

In one application of the invention in wireless multiple-input multiple-output communication systems, there is provided a wireless device capable of receiving data. The wireless device comprises a receiver for receiving and decoding a vector of transmitted information symbols according to any of the preceding embodiments.

In one application of the invention in optical multiple-input multiple output communication systems, there is provided an optical device capable of receiving data. The optical device comprises a receiver for receiving and decoding a vector of transmitted information symbols according to any of the preceding embodiments.

There is also provided a method of decoding a signal represented by a vector of information symbols received through a transmission channel in a communication system. The transmission channel being represented by a channel state matrix. The information symbols are selected from a given set of values and carry a set of information bits, the method comprising:
- dividing the channel state matrix into a number of sub-blocks of column vectors in accordance with a division of the vector of transmitted information symbols into a number of sub-vectors.
- determining a set of permuted channel state matrices by permuting the divided sub-blocks of column vectors, and selecting at least one permuted channel state matrix among the set of permuted channel state matrices according to a selection criterion;
- determining a transformed signal from the received signal and the at least one permuted channel state matrix and determining at least one estimate of each sub-vector of information symbols from the transformed signal by applying at least one iteration of a decoding algorithm.

The method comprises determining at least one estimate of a vector of transmitted information symbols from the at least one estimate of each sub-vector of information symbols.

The method may further comprise determining a determining an upper triangular matrix and an orthogonal matrix from each permuted channel state matrix by performing a QR decomposition of each permuted channel state matrix in the set of permuted channel matrices, and dividing each upper triangular matrix into upper triangular sub-matrices and rectangular sub-matrices.

In one embodiment, the selection criterion may depend on a selection metric related to the determined upper triangular sub-matrices and/or rectangular sub-matrices.

In a particular embodiment, the selection metric may be chosen in a group consisting of the number of zero components of said rectangular sub-matrices, the diagonal components of the upper triangular sub-matrices, the signal-to-noise-ratio associated to the upper triangular sub-matrices, and the conditioning number of the upper triangular sub-matrices and/or the rectangular sub-matrices.

There is also provided a computer program product for decoding a signal represented by a vector of information symbols received through a transmission channel in a communication system. The transmission channel is represented by a channel state matrix. The information symbols are selected from a given set of values and carry a set of information bits, the computer program product comprising a non-transitory computer readable storage medium; and instructions stored on the non-transitory computer readable storage medium that, when executed by a processor, cause the processor to:

- divide the channel state matrix into a number of sub-blocks of column vectors in accordance with a division of the vector of transmitted information symbols into a number of sub-vectors.
- determine a set of permuted channel state matrices by permuting the divided sub-blocks of column vectors, and selecting at least one permuted channel state matrix among the set of permuted channel state matrices according to a selection criterion.
- determine a transformed signal from the received signal and the selected at least one permuted channel state matrix and determining at least one estimate of each sub-vector of information symbols from the transformed signal by applying at least one iteration of a decoding algorithm;

The processor is caused to determine at least one estimate of a vector of transmitted information symbols from the determined at least one estimate of each sub-vector of information symbols.

Advantageously, the various embodiments of the invention allow optimizing the ordering of the sub-vectors of information symbols enabling reducing error propagation and therefore reducing the decoding error probability using a sub-block decoder.

Advantageously, in one application of the invention in wireless multi-user MIMO systems, the various embodiments of the invention allow improving the decoding order of the sub-vectors of transmitted information symbols originating from different users. As a result, the overall capacity of the communication system can be enhanced and the total error probability can be reduced.

Advantageously, in one application of the invention in combination with OFDM or FBMC modulation formats, the various embodiments of the invention allow improving the decoding order of the sub-vectors of information symbols transmitted over different sub-carriers, enabling efficient use of the spectral bands.

Advantageously, in one application of the invention in optical communication systems, the various embodiments of the invention allow improving the decoding order of the sub-vectors of information symbols propagating over different modes in a multi-mode optical-fiber, enabling adaptive low-complexity and low-error probability decoding taking into considerations the impairments of the optical transmission channel.

Further advantages of the present invention will become clear to the skilled person upon examination of the drawings and detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
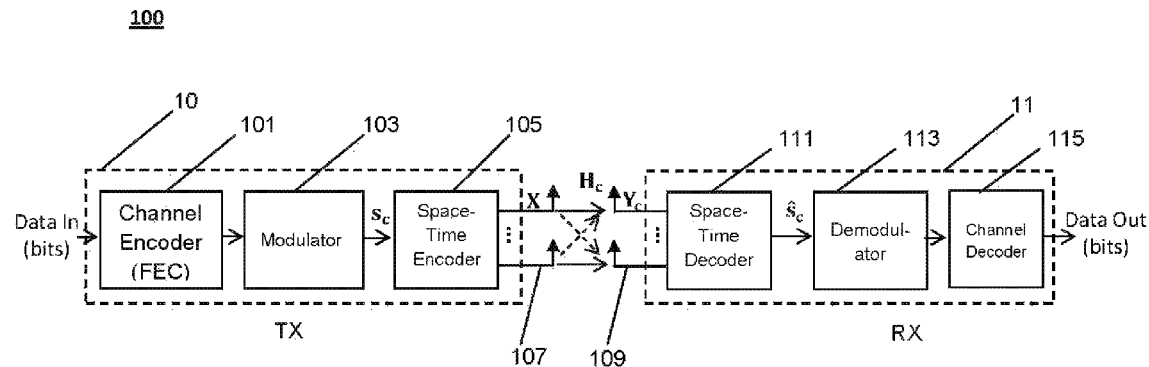
FIG. 1 is a schematic diagram of an implementation of a Space-Time decoder in a wireless single-user MIMO system.

Embodiments of the present invention provide methods, devices and computer program products for decoding a vector of information symbols, received through a transmission channel in a communication system, with an optimized decoding order. Embodiments of the present invention are based on a division of the vector of information symbols into a number of sub-vectors and a corresponding division of the channel state matrix representing the transmission channel into a number of sub-blocks of column vectors. An optimized decoding order is achieved by determining a permuted channel state matrix derived from a permutation of the sub-blocks of column vectors, and transforming the received signal using the permuted channel state matrix. Sub-vectors of information symbols are determined from a division of the transformed signal, and at least one estimate of each sub-vector of information symbols is computed. An estimate of the transmitted signal can thus be determined from the estimates of the different sub-vector of information symbols.

Methods, devices and computer programs according to the various embodiments of the invention may be implemented in communication systems comprising at least one transmitter device (also referred to hereinafter as a "transmitter") for transmitting a plurality of information symbols, and at least one receiver device (also referred to hereinafter as a "receiver") for receiving and decoding the information symbols transmitted by one or more transmitter devices.

Transmitter devices may be equipped with one or more transmit antennas and receiver devices may be equipped with one or more receive antennas.

The communication system may be a wireless single-user MIMO system in which a wireless multi-antenna transmitter device communicates a flow of information symbols representing an input data with a wireless multi-antenna receiver device configured to decode the conveyed symbols by the transmitter.

The communication system may be a wireless multi-user MIMO system in which a plurality of wireless transmitter devices and receiver devices communicate with each other. In this case, the communication system may use any multiple access techniques such as Time Division Multiple Access (TDMA), Space-Division Multiple Access (SDMA), CDMA or Frequency Division Multiple Access (FDMA).

The communication system may be an optical fiber-based communication system. The received signal may accordingly correspond to the information symbols transmitted through the different polarization states of the optical fiber or propagating over the different modes of multi-mode fibers. In addition, a multiple access technique such as WDMA may be used in such optical communication systems.

The communication channel may be any linear Additive White Gaussian Noise (AWGN) channel or a multipath channel using single-carrier or multi-carrier modulation formats such as OFDM and FBMC.

In a preferred application of the present invention, the complexity of sub-block decoding of a signal transmitted over a wireless single-user MIMO system may be reduced without sacrificing error performance. Exemplary applications of the sub-block decoding methods and devices include, with no limitation, MIMO decoding in configurations implementable in wireless standards such as the WiFi (IEEE 802.11n), the cellular WiMax (IEEE 802.16e), the cooperative WiMax (IEEE 802.16j), the Long Term Evolution (LTE), the LTE-advanced and the 5G ongoing standardization.

For illustration purposes only, the following description will be made with reference to a wireless single-user MIMO system accommodating a transmitter device equipped with $n_t \geq 1$ transmit antennas and a receiver device equipped with $n_r \geq 1$ receive antennas for decoding information symbols sent by the transmitter. However, the skilled person will readily understand that the various embodiments of the invention apply in other communication systems such as wireless distributed MIMO systems and optical MIMO systems. Generally, the invention may be integrated in any communication system characterized by a lattice representation of the channel output at receiver devices.

Referring to FIG. 1, there is shown an exemplary wireless communication system 100 in which embodiments of the present invention may be implemented. The MIMO system may comprise a transmitter implementing a Space Time Block Code (STBC) to distribute the symbols modulated over time and space dimensions. Each transmitter 10 of a station may exchange data with a receiver 11 of another station according to the wireless communication system 100.

The MIMO system may present a symmetric configuration. As used herein, a symmetric configuration refers to a configuration in which case the transmitter and the receiver are equipped with the same number of antennas $n_t = n_r$. Alternatively, the MIMO configuration may be asymmetric, in which case the number $n_r$ of receive antennas differs from the number $n_t$ of transmit antennas. In particular, in order to avoid a rank deficiency problem, the number $n_r$ of receive antennas is larger than the number $n_t$ of antennas at the transmitter.

The transmitter 10 can convey a signal to a receiver 11 over a noisy wireless MIMO channel. The transmitter 10 can be implemented in different devices or systems capable of operating in a wireless environment, such as for example in a user equipment or a mobile station. The transmitter may be fixed or mobile. The transmitter 10 may comprise for example:

- a channel encoder 101 implementing a Forward Error Correction (FEC) code such as block codes or convolutional codes;
- a modulator 103 implementing a modulation scheme such as Quadrature Amplitude Modulation (QAM) delivering a modulated symbol vector $s_c$;
- a Space-Time encoder 105 for delivering a codeword matrix X;
- $n_t$ transmit antennas 107, each transmit antenna being associated with an OFDM or FBMC modulator.

The transmitter 10 may be configured to encode a received flow of information bits as data input using a FEC encoder 101 implementing for example a convolutional code. The encoded binary signal may be then modulated into a symbol vector $s_c$ using the modulator 103. Different modulation schemes may be implemented such as $2^q$-QAM or $2^q$-PSK with $2^q$ symbols or states. The modulated vector $s_c$ may be a complex-value vector comprising $\kappa$ complex-value symbols $s_1, s_2, \ldots, s_\kappa$ with q bits per symbol.

An information symbol $s_j$ has a mean power $E_s$, and can be written in the form:

$$s_j = \text{Re}(s_j) + i\text{Im}(s_j) \qquad (1)$$

In equation (1), i denotes the complex number such that $i^2 = -1$ and the Re(•) and Im(•) operators output respectively the real and imaginary parts of an input value.

When modulation formats such as $2^q$-QAM are used, the $2^g$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet $A = [-(q-1), (q-1)]$. The minimum distance $d_{min}$ of a modulation scheme, represents the Euclidean distance between two adjacent points in the constellation an is equal to 2 in such example.

A Space-Time Encoder 105 may be used to generate a codeword matrix X from the encoded symbols. The space-time encoder 105 may use a linear STBC of length T and may deliver a codeword matrix X of dimension $n_t \times T$ that belongs to a codebook C and is sent over T time slots. The coding rate of such codes is equal to $\kappa/T$ complex symbols per channel use, where K is the number of encoded complex-value symbols composing the vector $s_c = [s_1, s_2, \ldots, s_\kappa]^t$ of dimension $\kappa$ in this case. When full rate codes are used, the Space-Time Encoder 105 encodes $\kappa = n_t T$ complex-value symbols. An example of STBCs is the Perfect Codes. Perfect codes provide full coding rates by encoding a number $\kappa = n_t^2 (T = n_t)$ of complex information symbols and satisfy a non-vanishing determinant property.

The Space-Time Encoder 105 may use a spatial multiplexing scheme known as V-BLAST scheme by multiplexing the received complex-value information symbols over the different transmit antennas without performing a coding in the time dimension.

The codeword so constructed may be converted from the time domain to the frequency domain using a multicarrier modulation technique, using for example OFDM or FDMC modulators, and spread over the transmit antennas 107. Signals may be sent from the transmit antennas 107 optionally after filtering, frequency transposition and amplification.

The receiver 11 may be configured to receive and decode a signal communicated by the transmitter 10 in a wireless network through a transmission channel (also referred to as a "communication channel") subject to fading and interference and represented by a complex-value channel matrix $H_c$. In addition, the communication channel may be noisy, affected for example by a Gaussian Noise.

The receiver 11 may be integrated in a base station such as a Node-B in a cellular network, an access point in a local area network or ad-hoc networks or any other interfacing device operating in a wireless environment. The receiver 11 may be fixed or mobile. In one exemplary embodiment, the receiver 11 may comprise:

- a Space-Time decoder 111 configured to deliver, from the channel matrix $H_c$ and the channel output signal $Y_c$ an estimation $\hat{s}_c$ of the modulated symbol vector $s_c$;
- a demodulator 113 configured to generate a binary sequence by performing a demodulation of the estimated symbols vector $\hat{s}'_c$;
- a channel decoder 115 configured to deliver as output a binary signal being the estimation of the transmitted bits using for example the Viterbi algorithm.

The receiver 11 implements a reverse processing of the processing performed in the transmitter 10. Accordingly, if a single-carrier modulation is used at the transmitter rather than a multi-carrier modulation, then the $n_r$ OFDM of FBMC demodulators may be replaced by corresponding single-carrier demodulators.

Figure 2:
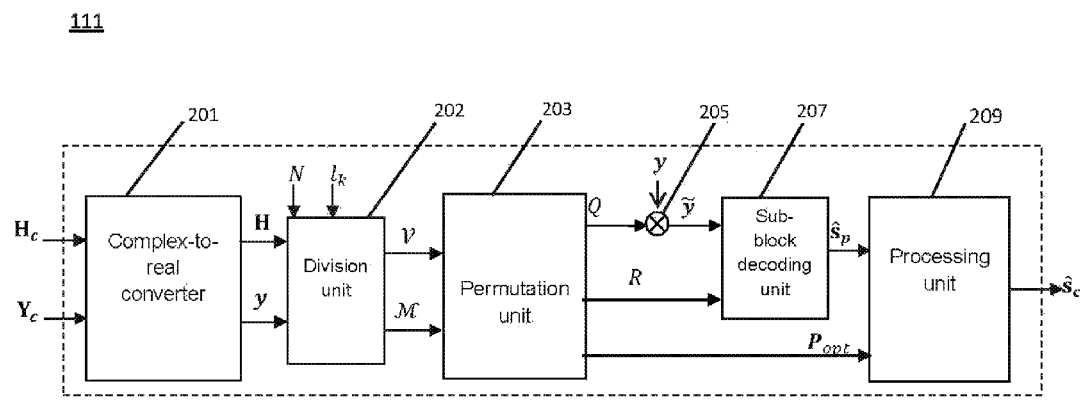
FIG. 2 is a block diagram illustrating a detailed structure of a Space-Time decoder according to an exemplary embodiment of the invention.

Referring to FIG. 2, a structure of a Space-Time decoder 111 according to certain embodiments of the invention in recursive sub-block decoding is illustrated. Accordingly, the Space-Time decoder 111 may comprise a complex-to-real converter 201 configured to convert the complex-value channel matrix $H_c$ into a real-value equivalent channel state matrix H, and convert the complex-value channel output $Y_c$ into a real-value vector y. The Space-Time decoder 111 may comprise a division unit 202 configured to divide the real-value channel state matrix H into N sub-blocks of column vectors in accordance with a division of the vector of information symbols into N sub-vectors such that $H=[H^{(1)} |H^{(2)}| \ldots |H^{(N)}]$ and $s=[s^{(1)}, s^{(2)}, \ldots, s^{(N)}]^t$, the vector of information symbols having real values in this example. The Space-Time decoder 111 further comprises a permutation unit 203 configured to determine a permutation matrix $P_{opt}$ and a corresponding selected permuted channel state matrix $H_{opt}$ from a set of permuted channel matrices according to one or more selection criteria. The selection criteria may be related to intermediary computed upper triangular matrices determined from a QR decomposition of each permuted channel matrix from the set of permuted channel matrices. The Space-Time decoder 111 may further comprise a multiplication unit 205 to determine the signal $\tilde{y}$ by scaling the real-value signal y by the transpose of the matrix Q obtained from the QR decomposition of the selected permuted channel state matrix. The Space-Time decoder 110 may comprise a sub-block decoding unit 207 configured to deliver an estimate of the real and imaginary parts of the information symbols composing a permuted vector of information symbols $\hat{s}_p$. The Space-Time decoder 111 may further comprise a processing unit 209 configured to deliver an estimate $\hat{s}_c$ of the complex-value transmitted information symbols by applying a permutation and a real-to-complex conversion to the vector $\hat{s}_p$. The conversion operation is the inverse of the processing performed at the complex-to-real converter 201.

Even if not limited to such applications, the invention has certain advantages in recursive sub-block decoding applications. The following description will be made with reference to an application to recursive sub-block decoding for illustration purpose only.

Figure 3:
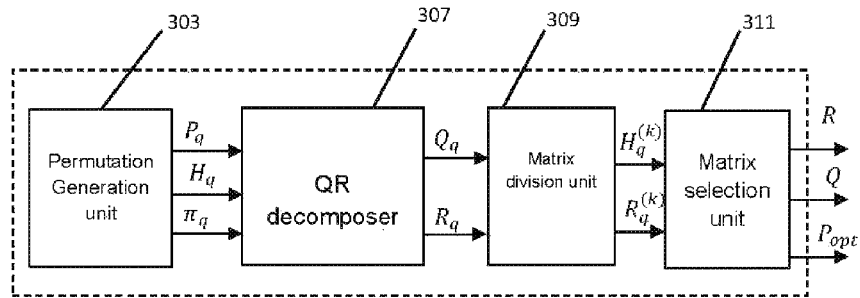
FIG. 3 is a block diagram illustrating a detailed structure of a permutation generator unit according to certain embodiments of the invention.

FIG. 3 is a block diagram representing the structure of the permutation unit 203 according to certain embodiments applied to perform recursive sub-block decoding.

The permutation unit 203 may further comprise a permutation generation unit 303 configured to determine a plurality of orderings $\pi_q$ and corresponding permutation matrices $P_q$ for $q=1, \ldots, N!$, where N is a predefined number of sub-blocks. In a preferred embodiment of the invention, the set of permuted channel state matrices $H_q$ comprises at least two permuted channel state matrices. As used herein, a permuted channel state matrix $H_q$ refers to a matrix resulting from the permutation of the columns of the channel state matrix H using the corresponding ordering $\pi_q$. The permuted matrices thus determined may be fed into a QR decomposer 307.

The QR decomposer 307 may be configured to perform a QR decomposition of each permuted channel state matrix $H_q$ such that $H_q=Q_q R_q$ where $Q_q$ is an orthogonal matrix and $R_q$ is an upper triangular matrix.

The permutation unit 203 may further comprise a matrix division unit 309 configured to divide, for $q=1, \ldots, N!$, the upper triangular matrices $R_q$ into $N+N(N+1)/2$ sub-matrices comprising N upper triangular sub-matrices $R_q^{(k)}$, $k=1, \ldots, N$ and $N(N+1)/2$ rectangular sub-matrices $B_q^{(kj)}$, $k=1, \ldots, N, j=k+1, \ldots, N$. The permutation unit 203 may further comprise a matrix selection unit 311 configured to select, among the computed permuted channel state matrice one permuted channel matrix $H_{opt}$ and its corresponding upper triangular matrix R, orthogonal matrix Q, ordering $\pi_{opt}$ and permutation matrix $P_{opt}$ according to a selection criterion C.

Figure 4:
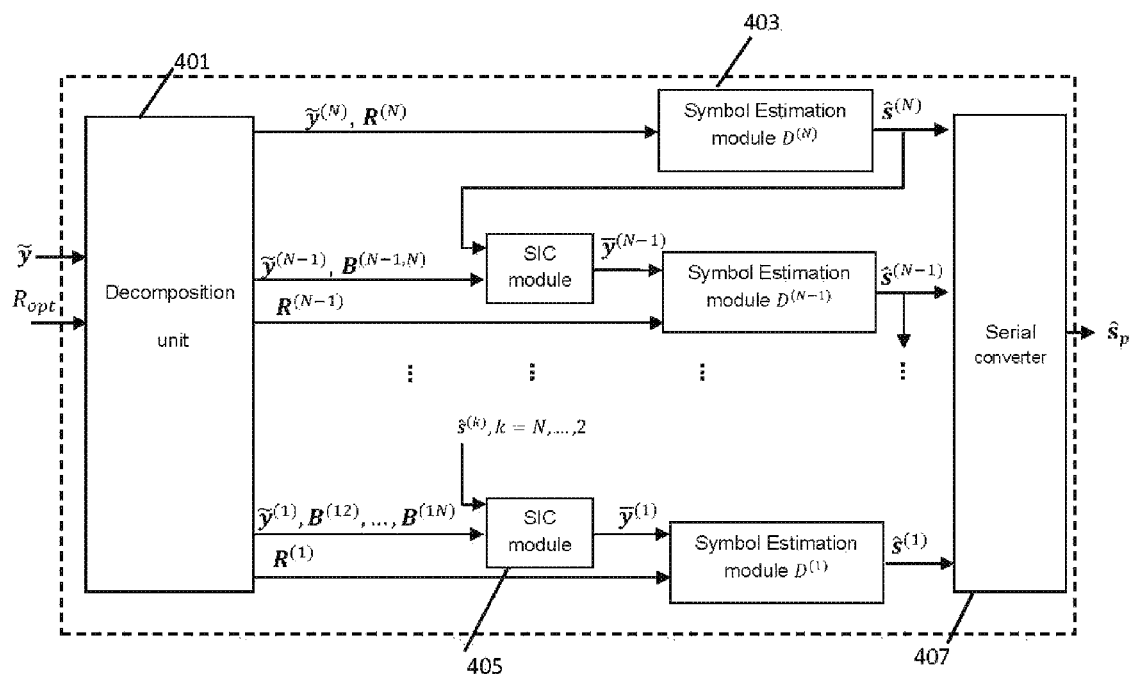
FIG. 4 is a block diagram illustrating a detailed structure of a sub-block decoding device according to an exemplary embodiment of the invention.

FIG. 4 is a block-diagram representing the structure of the sub-block decoding unit 207 according to certain embodiments. The sub-block decoding unit 207 may comprise a decomposition unit 401 configured to:

- divide the vectors $s_{per}$ and $Q^t y$ into sub-vectors $s^{(k)}$ and $\tilde{y}^{(k)}$ respectively, for $k=1, \ldots, N$, where a sub-vector of index k has a length $l_k$, and
- retrieve the upper triangular sub-matrices $R^{(k)}$ and rectangular sub-matrices $B^{(kj)}, k=1, \ldots, N, j=k+1, \ldots, N$ of the selected upper triangular matrix R.

These divided sub-matrices may have been previously stored in memory.

Using the sub-vectors $s^{(k)}$ and $\tilde{y}^{(k)}$ and the decomposed sub-matrices $R^{(k)}$ and $B^{(kj)}$, a set of sub-blocks $(SB)_k$ may be defined. For each index $k=1, \ldots, N-1$, a sub-block $(SB)_k$ may be defined as $(SB)_k=\{l_k, s^{(k)}, R^{(k)}, \tilde{y}^{(k)}, \tilde{w}^{(k)}, D^{(k)}, B^{(kj)}, j=k+1, \ldots, N\}$. For $k=N$, the corresponding sub-block is given by $(SB)_N=\{l_N, s^{(N)}, R^{(N)}, \tilde{y}^{(N)}, \tilde{w}^{(N)}, D^{(N)}\}$.

The sub-block decoding unit 207 may further comprise N symbol estimation units 403 and N−1 successive interference cancellation units 405. The sub-block decoding unit 207 may comprise also a SIC unit 405 associated with a sub-block $(SB)_k$ and configured to calculate a vector $\bar{y}^{(k)}$. A symbol estimation unit 403 may be associated with each sub-block $(SB)_k$ to determine an estimate $\hat{s}^{(k)}$ using a decoding algorithm $D^{(k)}$. The sub-block decoding unit 207 may further comprise a serial converter 407 configured to determine the real-value vector $\hat{s}_p = [\hat{s}^{(1)}, \hat{s}^{(2)}, \ldots, \hat{s}^{(N)}]^t$ by aggregating the outputs of the N symbol estimation units.

The skilled person will readily understand that the invention is not limited to the use of an estimation unit 403 for each sub-block. Alternatively a unique symbol estimation unit 403 or a set of symbol estimation units 403 (the set comprising less unit than the total number of sub-blocks) may be used to determine the estimate of each sub-block.

In one application of the present invention to a wireless Rayleigh fading multiple antenna system for decoding a signal sent from a transmitter equipped with $n_t$ transmit antennas using a V-BLAST spatial multiplexing scheme and $2^q$-QAM modulation, to a receiver equipped with $n_r$ receive antennas with $n_r \geq n_t$, the received complex-value signal may be written in the form:

$$y_c = H_c s_c + w_c \tag{2}$$

In equation 2, $y_c$ is an $n_r$-dimensional vector, $s_c$ denotes the complex-value vector of transmitted information symbols of dimension $n_t$. The complex-value $n_r \times n_t$ matrix $H_c$ represents the channel state matrix comprising the fading gains. In a Rayleigh fading channel, the entries of the channel state matrix $H_c$ are of independent identically distributed (i.i.d) complex Gaussian type. The channel matrix may be known or estimated in coherent transmissions at the receiver using estimation techniques. In addition to the multipath fading effects, the transmission channel may be noisy. The noise may result from the thermal noise of the system components, inter-user interference and intercepted interfering radiation by antennas. The total noise may be modeled by a zero-mean Additive White Gaussian Noise of variance $\sigma^2$ per real-value dimension modeled in equation (2) by the $n_r$-dimensional complex-value vector $w_c$.

In another embodiment of the invention to coded systems using a linear STBC to encode a modulated symbol vector $s_c$ comprising $\kappa$ complex-value symbols, the received signal is an $n_r \times T$ matrix $Y_c$ written in the complex-value form as:

$$Y_c = H_c X + W_c \tag{3}$$

In such an embodiment, the noise is represented by the $n_r \times T$ complex-value matrix $W_c$ of Gaussian i.i.d. zero-mean entries of variance $\sigma^2$ per real and imaginary parts.

Given the channel output, the receiver may attempt to generate an estimate of the original vector of information symbols.

Figure 5:
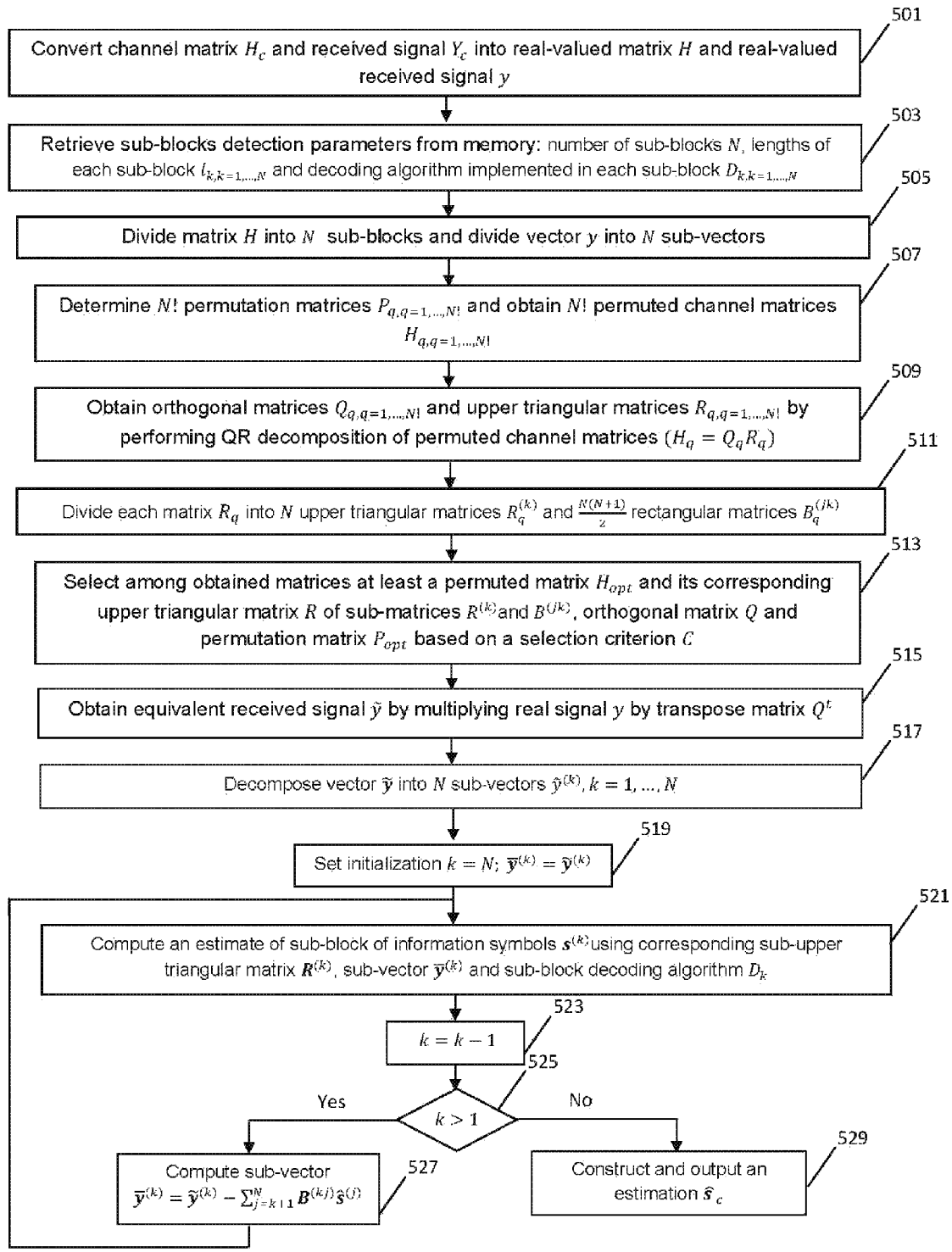
FIG. 5 is a flowchart depicting a method of sub-block decoding according to an exemplary embodiment of the invention.

FIG. 5 is a flowchart depicting the decoding method according to certain embodiments and according to a recursive sub-block decoding application.

In step 501, a complex-to-real conversion may be performed to determine a real-value form of the received signal.

For example, in one embodiment using a spatial multiplexing scheme, the system in equation (2) may be transformed into:

$$y = \begin{bmatrix} \text{Re}(y_c) \\ \text{Im}(y_c) \end{bmatrix} = \begin{bmatrix} \text{Re}(H_c) & -\text{Im}(H_c) \\ \text{Im}(H_c) & \text{Re}(H_c) \end{bmatrix} \begin{bmatrix} \text{Re}(s_c) \\ \text{Im}(s_c) \end{bmatrix} + \begin{bmatrix} \text{Re}(w_c) \\ \text{Im}(w_c) \end{bmatrix} \tag{4}$$

The $\text{Re}(\bullet)$ and $\text{Im}(\bullet)$ operators in equation (4) designate the real and imaginary parts of each element composing the underlying vector or matrix.

Equation (4) can be written in a lattice representation form as:

$$y = Hs + w \tag{5}$$

Alternatively, in one embodiment using a linear Space-Time Block code of length T and encoding K symbols, the real-value expression of the channel output can be written in the lattice representation form of equation (5) where the equivalent channel matrix is the real-value $2n_r T \times 2\kappa$ matrix $H_{eq}$ given by:

$$H_{eq} = (I_T \otimes H) G \tag{6}$$

The $2n_r T \times 2\kappa$ matrix G designates a real-value matrix known as a generator matrix or coding matrix of the linear Space-Time Block code. $I_T$ denotes the identity matrix of dimension T and the operator $\otimes$ is the Kronecker matrices product.

In an application of the invention to an asymmetric MIMO configuration with $n_t < n_r$, a lattice representation in the form of equation (5) can also be obtained by performing the complex-to-real conversion of step 501 to the equivalent system given by:

$$U^\dagger y_c = DV^\dagger s_c + U^\dagger w_c \tag{7}$$

The matrices U and V are unitary matrices obtained, together with matrix D, from the singular value decomposition of the matrix $H_c = UDV^t$. D is a diagonal matrix having positive diagonal entries representing the singular values of the matrix $H_c$.

Both spatial multiplexing and Space-Time Block coded symmetric and asymmetric MIMO schemes permit similar real-value lattice representations of the channel output given by equation (5). To facilitate the understanding of the following embodiments, the following description will thus be made with reference to a spatial multiplexing scheme and involving a symmetric MIMO configuration where the transmitter and receiver are equipped with the same number of antennas $n_t = n_r$, for illustration purposes only. Accordingly, the real-value vectors y, s and w in equation (5) will be represented as n-dimensional vectors with $n = 2n_t = 2n_r$ and the equivalent real-value channel matrix H will be represented by a square $n \times n$ matrix. The vector s comprises the real and imaginary parts of the original complex information symbols composing the vector $s_c$.

To perform recursive sub-block decoding, a set of predefined sub-block decoding parameters comprising at least one sub-block decoding parameter may be initially received or retrieved from memory in step 503. The sub-block decoding parameters may comprise a target number of sub-blocks N (preferably equal to at least 2), a set of sub-block lengths $l_{k, k=1, \ldots, N}$ satisfying $\Sigma_{k=1}^{N} l_k = N$, and/or a set of sub-block decoding algorithms $D^{(k), k=1, \ldots, N}$. The lengths $l_{k, k=1, \ldots, N}$ may be equal or different. The decoding algorithms may be similar or distinct. The following description will be made with reference to sub-block decoding parameters comprising these three types of parameters (N, $l_{k, k=1, \ldots, N}$, $D^{(k), k=1, \ldots, N}$).

A division of the real-value channel state matrix into sub-blocks may be performed in step 505 in accordance with a sub-vector division of the vector of information symbols s and the vector y, using the sub-block decoding parameters (N, $l_{k, k=1, \ldots, N}$). Specifically, the vector of real information symbols s may be divided into N sub-vectors such that $$s = \begin{bmatrix} s^{(1)} \\ \vdots \\ s^{(N)} \end{bmatrix}.$$

A sub-vector $s^{(k)}$ of index k has a length $l_k$ and comprises $l_k$ real symbols. Accordingly, the matrix H may be divided into N sub-blocks of column vectors such that $H=[H^{(1)}|H^{(2)}|\ldots|H^{(N)}]$. A sub-block of column vectors $H^{(k)}$ of index k may be seen as a rectangular matrix of dimension $n \times l_k$.

Using the sub-block division of the matrix H and the sub-vector division of the vector s, two ordered sets $\mathcal{V}$ and $\mathcal{M}$ and may be defined. The ordered set $\mathcal{V}$ may be in the form $\mathcal{V}=(SV_1, \ldots, SV_N)$ where a component $SV_k$ corresponds to the sub-vector $s^{(k)}$ of information symbols of index k. The order of the components $SV_k$ may correspond to the decoding order of the sub-vectors $s^{(k)}$. The ordered set $\mathcal{M}$ may be represented in the form $\mathcal{M}=(SM_1, \ldots, SM_N)$, where a component $SM_k$ corresponds to the sub-block of column vectors $H^{(k)}$ of index k. The order of the components $SM_k$ corresponds to the order of the sub-blocks of columns in the matrix H.

The columns of the channel matrix H are then ordered to change the symbol decoding order. In order to change the decoding order of the sub-vectors of information symbols, the ordering of the set components $SV_k$ and $SM_k$ may be changed using the defined sets $\mathcal{V}$ and $\mathcal{M}$.

In step 507, a set of N! permutation matrices $P_{q,q=1,\ldots,N!}$ and a set of N! permuted channel matrices $H_{q,q=1,\ldots,N!}$ may be determined. A permutation matrix $P_q$ of index q corresponds to an ordering $\pi_q$ of the sets $\mathcal{V}$ and $\mathcal{M}$ into the sets $\mathcal{V}_q$ and $\mathcal{M}_q$. As used herein, a permutation matrix refers to a matrix used to permute an ordered set of N sub-vectors is an orthogonal N×N matrix of binary entries, while conventional symbol-related ordering schemes such as V-BLAST and H-norm ordering correspond to n×n binary permutation matrices.

An ordering $\pi_q$ can be represented in the form $$\pi_q = \begin{pmatrix} SV_1 & SV_k & SV_N \\ \pi_q(SV_1) & \pi_q(SV_k) & \pi_q(SV_N) \end{pmatrix}$$

where a component $SV_k$ of index k is permuted to the component $\pi_q(SV_k)$. The permutation matrix $P_q$ corresponding to the ordering $\pi_q$ is a matrix with all zero entries except that in row k, the entry of the index corresponding to $\pi_q(SV_k)$ is equal to 1. Corresponding reordered sets $\mathcal{V}_q$ and $\mathcal{M}_q$ are then given by $\mathcal{V}_q=(\pi_q(SV_1), \ldots, \pi_q(SV_N))$ and $\mathcal{M}_q=(\pi_q(SM_1), \ldots, \pi_q(SM_N))$. Changing the sub-vector decoding order according to an ordering $\pi_q$ may be therefore obtained by determining the permuted vector $s_{per,q}$ and permuted matrix $H_q$ corresponding respectively to the ordered set $\mathcal{V}_q$ and $\mathcal{M}_q$. The reverse ordering $\pi_q^{-1}$ allows to determine the original vector s by ordering the permuted vector $s_{per,q}$.

To illustrate the derivation of a permutation matrix corresponding to a desired ordering of the sub-vectors of information symbols, the following example of n=4, N=3, $l_1=1, l_2=2, l_3=1$ is considered.

Accordingly, the vector $$s = \begin{bmatrix} s_1 \\ s_2 \\ s_3 \\ s_4 \end{bmatrix}$$

is divided into three sub-vectors as $$s = \begin{bmatrix} s^{(1)} \\ s^{(2)} \\ s^{(3)} \end{bmatrix}$$

such that $s^{(1)}=[s_1]$, $$s^{(2)} = \begin{bmatrix} s_2 \\ s_3 \end{bmatrix}$$

and $s^{(3)}=[s_4]$. The matrix $H=[h_1|h_2|h_3|h_4]$ comprising four column vectors $h_1, h_2, h_3$ and $h_4$ is correspondingly divided into three sub-blocks such that $H=[H^{(1)}|H^{(2)}|H^{(3)}]$ where $H^{(1)}=[h_1]$, $H^{(2)}=[h_2|h_3]$ and $H^{(3)}=[h_4]$. The ordered sets $\mathcal{V}$ and $\mathcal{M}$ are given by $\mathcal{V}=(SV_1, SV_2, SV_3)$ and $\mathcal{M}=(SM_1, SM_2, SM_3)$.

For such a setting, there exist six possible orderings of the sub-vectors of information symbols. One possible ordering allows obtaining a permuted vector given by $$s_{per,1} = \begin{bmatrix} s^{(3)} \\ s^{(1)} \\ s^{(2)} \end{bmatrix} = \begin{bmatrix} s_4 \\ s_1 \\ s_2 \\ s_3 \end{bmatrix}.$$

It corresponds to the ordering $\pi_1$ of the set $\mathcal{V}$ given by $$\pi = \begin{pmatrix} SV_1 & SV_2 & SV_3 \\ \pi(SV_1) & \pi(SV_2) & \pi(SV_3) \end{pmatrix} = \begin{pmatrix} SV_1 & SV_2 & SV_3 \\ SV_3 & SV_1 & SV_2 \end{pmatrix}.$$

The corresponding permutation matrix is then given by $$P = \begin{bmatrix} 0 & 0 & 1 \\ 1 & 0 & 0 \\ 0 & 1 & 0 \end{bmatrix},$$

and the reordered sets $\mathcal{V}_1$ and $\mathcal{M}_1$ are accordingly given by $\mathcal{V}_1=(SV_3, SV_1, SV_2)$ and $\mathcal{M}_1=(SM_3, SM_1, SM_2)$. The permuted vector $s_{per,1}$ and the permuted channel matrix $H_1$ are therefore obtained by permuting the sub-vectors and sub-blocks of column vectors in accordance with the permuted ordering of the sets $\mathcal{V}_1$ and $\mathcal{M}_1$ respectively.

In step 509, a QR decomposition of each matrix of the obtained set of permuted channel matrices is performed to determine N! orthogonal matrices $Q_q$ and N! upper triangular matrices $R_q$ such that $H_q=Q_q R_q$ for $q=1, \ldots, N!$.

In step 511, a division of the obtained N! upper triangular matrices $R_q$ into sub-matrices is performed. Accordingly, for each $q=1, \ldots, N!$, an upper triangular matrix $R_q$ is divided into $$N + \frac{N(N+1)}{2}$$

sub-matrices comprising N upper triangular sub-matrices $R_q^{(k)}, k=1, \ldots, N$ and $$\frac{N(N+1)}{2}$$

rectangular sub-matrices $B_q^{(kj)}, k=1, \ldots, N, j=k+1, \ldots, N$ such that:

$$R_q = \begin{bmatrix} R_q^{(1)} & \cdots & B_q^{(1,N-1)} & B_q^{(1N)} \\ 0 & \cdots & \vdots & \vdots \\ 0 & 0 & R_q^{(N-1)} & B_q^{(N-1,N)} \\ 0 & 0 & 0 & R_q^{(N)} \end{bmatrix} \quad (8)$$

A divided upper triangular sub-matrix $R_q^{(k)}, k=1, \ldots, N$ designates a square matrix of dimension $l_k \times l_k$.

A divided sub-matrix $B_q^{(kj)}, k=1, \ldots, N; j=k+1, \ldots, N$ designates a rectangular matrix of dimension $l_k \times l_j$ and corresponds to the inter-symbol interference between the sub-vectors $s_{per,q}^{(k)}$ and $s_{per,q}^{(j)}$ of the permuted vector $s_{per,q}$.

In step 513, at least one permuted channel matrix $H_{opt}$ and its corresponding upper triangular matrix R, orthogonal matrix Q, ordering $\pi_{opt}$ and permutation matrix $P_{opt}$ are selected according to a selection criterion C.

In certain embodiments, the selection criterion C may correspond to a maximization or minimization of a selection metric related to the divided sub-matrices of the upper triangular matrices $R_q$ for $q=1, \ldots, N!$. In particular, a selection metric may be related to the components of the divided upper triangular sub-matrices $R_q^{(k)}, k=1, \ldots, N$ and/or to the components of the divided rectangular sub-matrices $B_q^{(kj)}, k=1, \ldots, N; j=k+1, \ldots, N$.

In one embodiment, the selection metric may correspond to the number of zero entries in the rectangular sub-matrices $B_q^{(kj)}$. This selection metric may interestingly be used in order to reduce the decoding error propagation by reducing the impact of the interference between the sub-vectors of information symbols depicted by the components of the rectangular sub-matrices $B_q^{(kj)}$. Accordingly, the selected ordering $\pi_{opt}$ over all possible orderings $\pi_q, q=1, \ldots, N!$ may correspond to the ordering which allows obtaining an upper triangular matrix R with the minimum number of zero elements in each sub-matrix $B_q^{(kj)}$ for $k=1, \ldots, N; j=k+1, \ldots, N$.

In other embodiments, the selection metric may correspond to the average of the diagonal entries of the upper triangular sub-matrices. Accordingly, the selected ordering $\pi_{opt}$ may correspond to the ordering which allows maximizing, over all possible orderings $\pi_q, q=1, \ldots, N!$, the minimum average of the diagonal entries of the sub-matrix $R_q^{(k)}$ for $k=1, \ldots, N$. Such an embodiment may be used advantageously when a decoding algorithm $D^{(k)}$ implements a sequential decoding strategy for determining an estimate of the sub-vector of information symbols $s^{(k)}$.

In another embodiment, the selection metric may correspond to the signal-to-noise ratio $SNR^{(k)}$ per sub-vector of information symbols $s^{(k)}$ measured using the upper triangular sub-matrices $R_q^{(k)}$. Accordingly, the selected ordering $\pi_{opt}$ may correspond to the ordering which maximizes, over all possible orderings $\pi_q, q=1, \ldots, N!$, the minimum $SNR^{(k)}$ for $k=1, \ldots, N$. Such an embodiment may be used when a decoding algorithm $D^{(k)}$ implements a ZF-DFE decoder for determining an estimate of the sub-vector of information symbols $s^{(k)}$.

In still another embodiment, the selection metric may correspond to the conditioning number of the upper triangular sub-matrices. For a matrix U, the conditioning number $\tau(U) \in [0,1]$ is given by:

$$\tau(U) = \frac{\sigma_{min}}{\sigma_{max}} \quad (9)$$

In equation (9), $\sigma_{min}$ and $\sigma_{max}$ correspond respectively to the minimum and maximum singular values of the matrix U. The conditioning number of a given matrix designates an orthogonality measure indicative of the orthogonality of its column vectors. The smaller the conditioning number is, the better the orthogonality of the column vectors. Accordingly, the selected ordering $\pi_{opt}$ may correspond to the ordering which minimizes, over all possible orderings $\pi_q, q=1, \ldots, N!$, the conditioning number for the divided sub-matrices $R_q^{(k)}$ and/or $B_q^{(kj)}$ for $k=1, \ldots, N; j=k+1, \ldots, N$. Minimizing the conditioning number for the sub-matrices associated with a block $(SB)_k$ may impact the performance and/or computational complexity of the decoding algorithm $D^{(k)}$. For example, if a decoding algorithm $D^{(k)}$ implements a ZF, MMSE or ZF-DFE decoder, better error performance may be achieved using divided matrices of minimized conditioning numbers.

In step 515, an equivalent system to equation (5) may be determined using the selected permutation. Accordingly, equation (5) may first be rewritten as:

$$y = H_{opt} s_{per} + w = QR s_{per} + w \quad (10)$$

Given the orthogonality of the matrix Q, an equivalent system to equation (10) may be determined according to:

$$\tilde{y} = Q^t y = R s_{per} + \tilde{w} \quad (11)$$

In equation (11), $\tilde{w} = Q^t w$ designates a scaled noise vector. The real-value equivalent system of equation (11) is considered for the estimation of the originally transmitted information symbols.

The ML decoding problem for jointly decoding the information symbols is given by:

$$\hat{s}_{per,ML} = \mathrm{argmin}_{s_{per} \in A} \|\tilde{y} - R s_{per}\|^2 \quad (12)$$

In equation (12), $A = [c_{min}, c_{max}]$ designates the alphabet to which belong the real and imaginary parts of the complex-value vector $s_c$ composing the real vector s and equivalently the permuted vector $S_{per}$. The alphabet may be defined by the bounds $c_{min}$ and $c_{max}$. An ML metric is defined as:

$$m(s) = \|\tilde{y} - R s_{per}\|^2 \quad (13)$$

In one application of the invention to recursive sub-block decoding, a sub-block decoding may be performed to recover an estimation of the original information symbols. Accordingly, in step 517, a division of the vector $\tilde{y}$ into N sub-vectors is performed such that $$\tilde{y} = \begin{bmatrix} \tilde{y}^{(1)} \\ \vdots \\ \tilde{y}^{(N)} \end{bmatrix}.$$

A sub-vector $\tilde{y}^{(k)}$ of index k, for k=1, ..., N has a lengths $l_k$. The same sub-vector division may be applied to noise vector $\tilde{w}$ to determine N sub-vectors $\tilde{w}^{(k)}$ of lengths $l_k$ such that $$\tilde{w} = \begin{bmatrix} \tilde{w}^{(1)} \\ \vdots \\ \tilde{w}^{(N)} \end{bmatrix}.$$

The sub-block decoding parameters, divided sub-matrices $R^{(k)}$ and $B^{(kj)}$ of the selected upper triangular matrix R and the divided sub-vectors $\tilde{y}^{(k)}$ may be grouped into sub-blocks $(SB)_k$, k=1, ..., N. A sub-block $(SB)_k$, for k=1, ..., N−1, may be defined by a set of parameters such that $(SB)_k = \{l_k, s^{(k)}, R^{(k)}, \tilde{y}^{(k)}, \tilde{w}^{(k)}, D^{(k)}, B^{(kj)}, j=k+1, ..., N\}$, where:

$$\tilde{y}^{(k)} = R^{(k)}s^{(k)} + \Sigma_{j=k+1}^{N} B^{(kj)}s^{(j)} + \tilde{w}^{(k)} \quad (14)$$

For k=N, the sub-block may be defined by $(SB)_N = \{l_N, s^{(N)}, R^{(N)}, \tilde{y}^{(N)}, \tilde{w}^{(N)}, D^{(N)}\}$ such that:

$$\tilde{y}^{(N)} = R^{(N)}s^{(N)} + \tilde{w}^{(N)} \quad (15)$$

Systems in equations (14) and (15) may be used for the decoding of the various sub-vectors of information symbols.

According to such groups of sub-blocks, the ML decoding metric in equation (13) may be written as:

$$m(s) = \|\tilde{y} - Rs_{per}\|^2 = \|\Sigma_{k=1}^{N} \tilde{y}^{(k)} - (R^{(k)}s^{(k)} + \Sigma_{j=k+1}^{N} B^{(kj)}s^{(j)})\|^2 \quad (16)$$

Accordingly, a sub-block estimation of the original sub-vectors of symbols $s^{(k)}$, k=N, N−1, ..., 1 is performed recursively in step 521. An initialization may be performed in step 519 corresponding to k=N.

Step 521 may be repeated for each sub-block $(SB)_k$, k=N, N−1, ... 1 to determine a sub-vector estimation $\hat{s}^{(k)}$ of the sub-vector of symbols $s^{(k)}$ of the permuted vector $s_{per}$. For each k=N−1, ..., 1, a sub-vector $\bar{y}^{(k)} = \tilde{y}^{(k)} - \Sigma_{j=k+1}^{N} B^{(kj)}\hat{s}^{(j)}$ may be computed in step 527 from the previously estimated sub-vectors $\hat{s}^{(j)}$ and the rectangular sub-matrices $B^{(kj)}$, j=k+1, ..., N. An estimate of the sub-vector of index k may be determined using the decoding algorithm $D^{(k)}$, the upper triangular matrix $R^{(k)}$, and the calculated sub-vector $\bar{y}^{(k)}$. For k=N, the estimate $\hat{s}^{(N)}$ may be determined using the corresponding decoding algorithm $D^{(N)}$, the corresponding upper triangular sub-matrix $R^{(N)}$ and the vector $\bar{y}^{(N)} = \tilde{y}^{(N)}$ initialized in step 519.

If it is determined that all the sub-vectors of symbols have been estimated in step 525, step 529 may be performed to construct an output, from the sub-vectors $\hat{s}^{(k)}$, k=1, ..., N, as an estimation $\hat{s}_c$ of the complex-value vector of information symbols vector $s_c$. The construction step may comprise three phases. First, a real vector $\hat{s}_{per} = [\hat{s}^{(1)}, ..., \hat{s}^{(N)}]^t$ may be constructed by aggregating the different sub-vector estimates. Then, an estimate $\hat{s}$ of the vector of information symbols s is determined by ordering the vector $\hat{s}_{per}$ using the reverse ordering $\pi_{opt}^{-}$. Finally, the obtained vectors is converted into the complex vector $\hat{s}_c = [\hat{s}_1, \hat{s}_2, ..., \hat{s}_{n/2}]^t$ such that a component $\hat{s}_j$ for j=1, ..., n/2 is given by:

$$-\hat{s}_j = (\hat{s})_j + i(\hat{s})_{j+n/2} \quad (17)$$

In equation (17), $(u)_j$ denotes the $j^{th}$ element of a vector u.

According to certain embodiments of the invention, the decoding algorithms $D^{(k)}$, implemented in step 521 for k=1, ..., N may be similar or different. A decoding algorithm $D^{(k)}$ maybe, but not limited to, any sequential decoding scheme, a ZF, an MMSE or ZF-DFE.

In one embodiment where a sequential decoder is used in a given sub-block $(SB)_k$, the corresponding decoder $D^{(k)}$ delivers an estimate $\hat{s}^{(k)}$ by minimizing the sub-block metric $m(s^{(k)}) = \|\bar{y}^{(k)} - R^{(k)}s^{(k)}\|^2$ II according to:

$$\hat{s}^{(k)} = \text{argmin}_{s^{(k)} \in A^{l_k}} m(s^{(k)}) = \text{argmin}_{s^{(k)} \in A^{l_k}} \|\bar{y}^{(k)} - R^{(k)}s^{(k)}\|^2 \quad (18)$$

Sequential tree-search algorithms such as the Sphere Decoder (SD), the Stack decoder or and the SB-Stack decoder (SB-Stack), may be used to solve equation (18).

Further, in certain embodiments, a preprocessing on the upper triangular sub-matrices $R^{(k)}$ prior to decoding may be performed using for example a lattice reduction and/or an MMSE-GDFE filtering. Preprocessing methods may also be applied on the channel state matrix prior to sub-block division and decoding.

Figure 7:
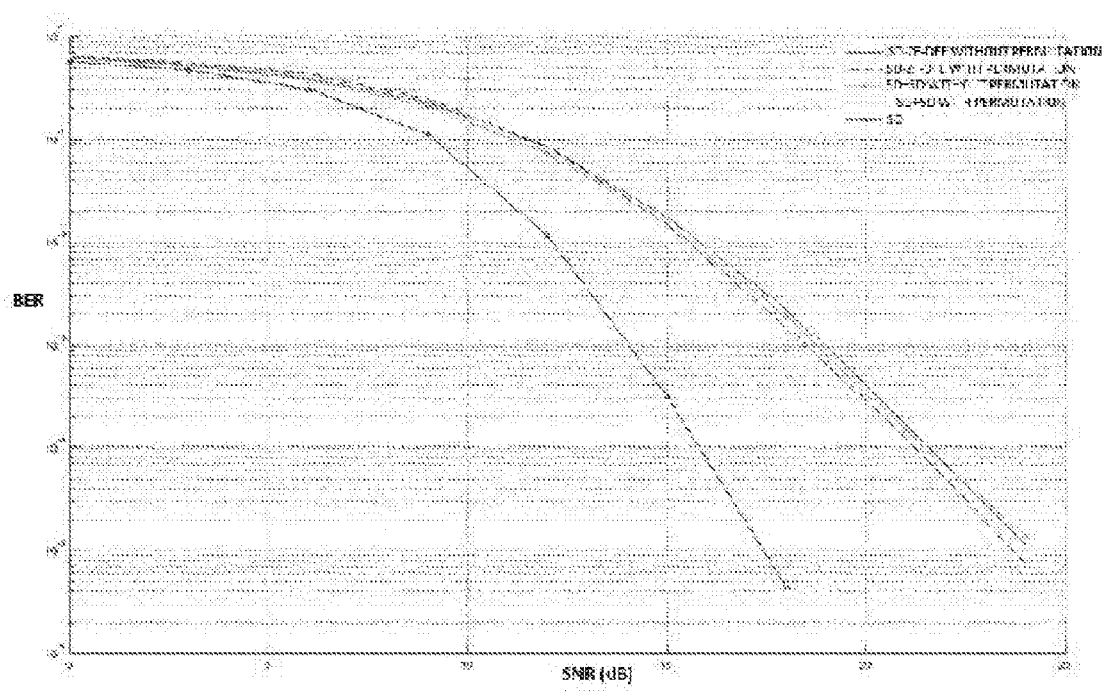
FIG. 7 is a diagram illustrating the Bit Error Rate performance obtained using a sub-block decoding device according to some embodiments of the invention.

FIG. 7 illustrates the error probability performance evaluated in terms of the Bit Error Rate (BER) for a 16×16 MIMO system using spatial multiplexing of 16-QAM modulated symbols. Numerical results are obtained for different embodiments of the decoding method and for a conventional decoding method:

1. 'SD-ZF-DFE WITHOUT PERMUTATION' refers to an embodiment in which the sub-block decoding method is based on a division of the vector of information symbols into N=2 sub-vectors $s^{(1)}$ and $s^{(2)}$. No permutation of the sub-blocks of the channel matrix is performed, the sub-vector $s^{(2)}$ being decoded using a Sphere Decoding algorithm and the sub-vector $s^{(1)}$ being then decoded using a ZD-DFE decoder.
2. 'SD-ZF-DFE WITH PERMUTATION' refers to an embodiment in which the sub-block decoding method is based on a division of the vector of information symbols into N=2 sub-vectors $s^{(1)}$ and $s^{(2)}$ with a permutation of the sub-blocks of the channel matrix, the optimal permutation being selected among a total number of generated permutations equal to 2!=2 (corresponding to N!). The sub-vector $s^{(2)}$ is decoded using a Sphere Decoding algorithm and the sub-vector $s^{(1)}$ is then decoded using a ZD-DFE decoder.
3. 'SD+SD WITHOUT PERMUTATION' refers to a an embodiment in which the sub-block decoding method is based on a division of the vector of information symbols into N=2 sub-vectors $s^{(1)}$ and $s^{(2)}$. No permutation of the sub-blocks of the channel matrix is performed, the sub-vectors $s^{(2)}$ and $s^{(1)}$ being decoded recursively using a Sphere Decoding algorithm.
4. 'SD+SD WITH PERMUTATION' refers to an embodiment in which the sub-block decoding method is based on a division of the vector of information symbols into N=2 sub-vectors $s^{(1)}$ and $s^{(2)}$ with a permutation of the sub-blocks of the channel matrix, the optimal permutation being selected among a total number of generated permutations equal to 2!=2 (corresponding to N!). The sub-vectors $s^{(2)}$ and $s^{(1)}$ are decoded recursively using a Sphere Decoding algorithm.
5. 'SD' refers to a decoding method according to which the vector of information symbols is decoded as a single vector (i.e. no division into sub-vectors is performed) using the conventional Sphere Decoder. Numerical results show that sub-block decoding based on an ordering of the sub-blocks of the channel matrix according to the embodiments of the invention offers better error probability performances than conventional sub-block decoding (without permutation). In addition, compared to the prior art approaches based on an exhaustive ordering of the column vectors of the channel matrix, the ordering/permutation methods according to the various embodiments of the invention require operations with reduced computational complexity as the number of permutations applied to the channel matrix is reduced from n! to N! (n! being the number of column vector permutation required in existing ordering techniques).

The methods and devices described herein may be implemented by various means. For example, these techniques may be implemented in hardware, software, or a combination thereof. For a hardware implementation, the processing elements of a Space-Time decoder 111 can be implemented for example according to a hardware-only configuration (for example, in one or more FPGA, ASIC or VLSI integrated circuits with the corresponding memory) or according to a configuration using both VLSI and DSP.

Figure 6:
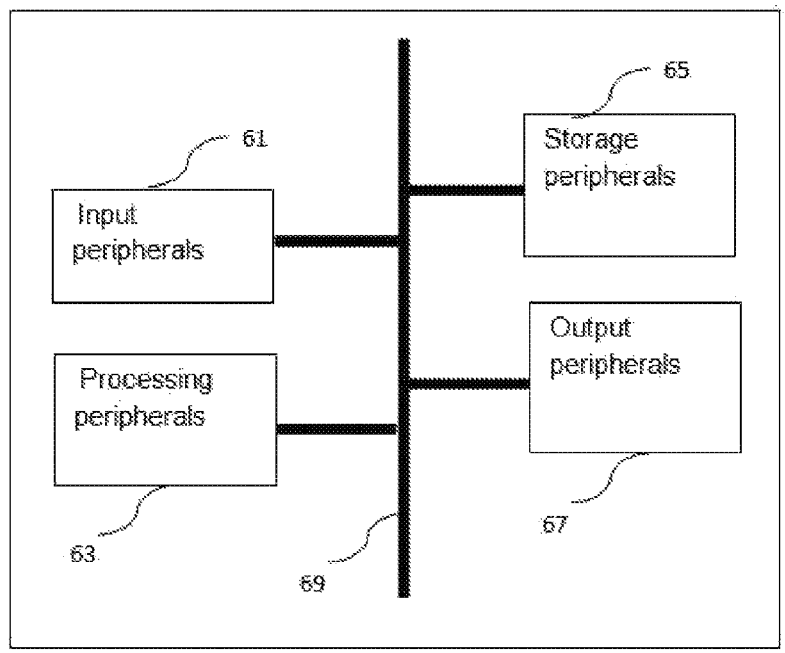
FIG. 6 illustrates a hardware architecture of a Space-Time decoder according to certain embodiments of the invention.

FIG. 6 represents an exemplary hardware architecture 60 of the Space-Time decoder 111 according to certain embodiments of the invention. The hardware architecture 60 may be implemented in a machine or computer executed device. As illustrated, the Space-Time decoder 111 may include various computing, storage and communication units possibly interacting with one another through a data and address port 69 and comprising:

Input peripherals 61 for receiving for example input data from the receive antennas 109

Processing peripherals 63 comprising one or more microprocessors (CPU) such as an FPGA or an ASIC configured for example to execute the corresponding instructions to run the methods and algorithms according to the various embodiments of the invention;

Storage peripherals 45 possibly comprising a random access memory (RAM) or a read-only memory to store for example the sub-block decoding parameters and the set of permutation matrices computed prior to decoding.

Output peripherals 47 comprising communication means such as displays enabling for example man-to-machine interaction between the receiver device 11 and a MIMO system administrator for configuration and maintenance purposes.

While embodiments of the invention have been illustrated by a description of various examples, and while these embodiments have been described in considerable detail, it is not the intent of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Further, the various embodiments of the invention are not limited to particular types of recursive sub-block decoding, and apply to any other types of sub-block decoding such as Semi-exhaustive Recursive Block decoding disclosed in the patent application EP N° 15306808.5. Further, the various embodiments of the invention apply both to hard and soft decoding.

In one application to soft decoding, methods and devices according to the invention allow generating a list of estimates of the original vector of information symbols. The list thus obtained can be used to calculate the log likelihood ratio values for approximating the extrinsic information of the different information bits carried by the original information symbols. Several iterations of steps 521 to 529 may be performed in order to fill the list of estimates.

Further, while certain embodiments of the invention have been described in relation to a wireless single-user MIMO system, it should be noted that the invention is not limited to such application. The invention may be integrated in any receiver device operating in any linear communication system characterized by a lattice representation of the channel output. The communication system may be wired, wireless or optical fiber-based accommodating single or multiple users, using single or multiple antennas, and single or multi-carrier communication techniques. For example, the present invention may be integrated in a receiver device implemented in a wireless distributed MIMO system. Distributed MIMO may be used for example in cellular uplink communications applied in 3G, 4G and LTE standards. Cooperative communications applied for example in ad-hoc networks (wireless sensor networks, machine-to-machine communications, internet of things . . . ) are also examples of distributed MIMO systems. In addition to wireless networks, the present invention may be integrated in optical receiver devices implemented in optical fiber-based communication systems such as Polarization Division Multiplexing-OFDM (PDM-OFDM) systems.

Further, the invention is not limited to communication devices and may be integrated in signal processing devices such as electronic filters of finite impulse response (FIR) used in audio applications like audio crossovers and audio mastering. Accordingly, certain embodiments of the invention may be used to determine an estimate of an input sequence, given an output sequence of a FIR filter of order M.

In another application, methods, devices and computer program products according to some embodiments of the invention may be implemented in a Global Navigation Satellite System (GNSS), such as IRNSS, Beidou, GLONASS, Galileo; GPS comprising for instance at least a GPS receiver for estimating positioning parameters using for example carrier phase measurements.

Further, methods, devices and computer program products according to some embodiments of the invention may be implemented in cryptographic systems for determining estimates on private secret values used in a cryptographic algorithm for encrypting/decrypting data or messages during their storage, processing or communication. In lattice-based cryptography applications, data/messages are encrypted in the form of lattice points. The decryption of such encrypted data may be advantageously performed according to some embodiments of the invention, enabling for a high probability of success recovery of secret values with a reduced complexity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

The invention claimed is:

1. A decoder for decoding a signal represented by a vector of information symbols received through a transmission channel in a communication system, said transmission channel being represented by a channel state matrix, said information symbols being selected from a given set of values carrying a set of information bits, wherein said decoder comprises:

a division unit configured to divide the channel state matrix into a number of sub-blocks of column vectors, in accordance with a division of said vector of information symbols into a number of sub-vectors;

a permutation unit configured to determine a set of permuted channel state matrices by permuting said sub-blocks of column vectors, the permutation unit being further configured to select at least one permuted channel state matrix among said set of permuted channel state matrices according to a selection criterion;

a sub-block decoding unit configured to determine a transformed signal from said signal and said at least one permuted channel state matrix and determine at least one estimate of each sub-vector of information symbols from said transformed signal by applying at least one iteration of a decoding algorithm;

the decoder being configured to determine at least one estimate of a vector of transmitted information symbols from said at least one estimate of each sub-vector of information symbols.

2. The decoder of claim 1, wherein said permutation unit is further configured to determine an upper triangular matrix and an orthogonal matrix from each permuted channel state matrix by performing a QR decomposition of said each permuted channel state matrix, the permutation unit further comprising dividing each upper triangular matrix determined from each permuted channel state matrix into upper triangular sub-matrices and rectangular sub-matrices.

3. The decoder of claim 2, wherein said selection criterion depends on a selection metric related to said upper triangular sub-matrices and/or said rectangular sub-matrices.

4. The decoder of claim 3, wherein the selection metric is chosen in a group consisting of the number of the zero components of said rectangular sub-matrices, the diagonal components of said upper triangular sub-matrices, the signal-to-noise-ratio associated to said upper triangular sub-matrices, and the conditioning number of said upper triangular sub-matrices and/or said rectangular sub-matrices.

5. The decoder of claim 1, wherein said division unit is configured to divide said channel state matrix depending on at least one sub-block decoding parameter, said at least one sub-block decoding parameter being chosen in a group consisting of a predefined number of sub-blocks, a set of sub-block lengths, and a predefined set of decoding algorithms.

6. The decoder of claim 1, wherein said number of sub-blocks of column vectors is set equal to the number of sub-blocks.

7. The decoder of claim 1, wherein said number of permuted channel state matrices is less than or equal to the number of sub-blocks.

8. The decoder of claim 1, wherein a different decoding algorithm is applied for each sub-vector.

9. The decoder of claim 1, wherein said decoding algorithm is chosen in a group consisting of a sequential decoding algorithm, a ZF decoding algorithm, a ZF-DFE decoding algorithm and an MMSE decoding algorithm.

10. The decoder of claim 1, wherein said sub-block decoding unit is further configured to perform a lattice reduction and/or MMSE-GDFE preprocessing on said selected at least one permuted channel state matrix.

11. The decoder of claim 1, wherein it is configured to determine a plurality of estimates of each sub-vector of transmitted information symbol for delivering soft-output decisions on said sets of information bits.

12. A receiver for receiving and decoding a vector of transmitted information symbols, wherein the receiver comprises a decoder according to claim 1 configured to decode said vector of transmitted information symbols.

13. A wireless device capable of receiving data in a wireless multiple-input multiple-output communication system, wherein the wireless device comprises a receiver according to claim 12 configured to receive and decode a vector of transmitted information symbols.

14. An optical device capable of receiving data in an optical multiple-input multiple-output communication system, wherein the optical device comprises a receiver according to claim 12 configured to receive and decode a vector of transmitted information symbols.

15. A method of decoding a signal represented by a vector of information symbols received through a transmission channel in a communication system, said transmission channel being represented by a channel state matrix, said information symbols being selected from a given set of values carrying a set of information bits, wherein said method comprises:

dividing the channel state matrix into a number of sub-blocks of column vectors in accordance with a division of said vector of transmitted information symbols into a number of sub-vectors;

determining a set of permuted channel state matrices by permuting said sub-blocks of column vectors, and selecting at least one permuted channel state matrix among said set of permuted channel state matrices according to a selection criterion;

determining a transformed signal from said signal and said at least one permuted channel state matrix and determining at least one estimate of each sub-vector of information symbols from said transformed signal by applying at least one iteration of a decoding algorithm;

the method comprising determining at least one estimate of a vector of transmitted information symbols from said at least one estimate of each sub-vector of information symbols.

16. The method of claim 15, wherein it further comprises determining an upper triangular matrix and an orthogonal matrix from each permuted channel state matrix by performing a QR decomposition of said each permuted channel state matrix, and dividing each upper triangular matrix into upper triangular sub-matrices and rectangular sub-matrices.

17. The method of claim 16, wherein said selection criterion depends on a selection metric related to said upper triangular sub-matrices and/or said rectangular sub-matrices.

18. The method of claim 17 wherein said selection metric is chosen in a group consisting of the number of zero components of said rectangular sub-matrices, the diagonal components of said upper triangular sub-matrices, the signal-to-noise-ratio associated to said upper triangular sub-matrices, and the conditioning number of said upper triangular sub-matrices and/or said rectangular sub-matrices.

19. A computer program product for decoding a signal represented by a vector of information symbols received through a transmission channel in a communication system, said transmission channel being represented by a channel state matrix, said information symbols being selected from a given set of values carrying a set of information bits, the computer program product comprising:

a non-transitory computer readable storage medium; and instructions stored on the non-transitory computer readable storage medium that, when executed by a processor, cause the processor to:

divide the channel state matrix into a number of sub-blocks of column vectors in accordance with a division of said vector of transmitted information symbols into a number of sub-vectors;

determine a set of permuted channel state matrices by permuting said sub-blocks of column vectors, and selecting at least one permuted channel state matrix among said set of permuted channel state matrices according to a selection criterion;

determine a transformed signal from said signal and said at least one permuted channel state matrix and determining at least one estimate of each sub-vector of information symbols from said transformed signal by applying at least one iteration of a decoding algorithm;

said processor being caused to determine at least one estimate of a vector of transmitted information symbols from said at least one estimate of each sub-vector of information symbols.

\* \* \* \* \*